(12) United States Patent
Kinoshita

(10) Patent No.: US 11,336,811 B2
(45) Date of Patent: May 17, 2022

(54) OPERATION APPARATUS, OPTICAL APPARATUS, AND IMAGE PICKUP APPARATUS

(71) Applicant: CANON KABUSHIKI KAISHA, Tokyo (JP)

(72) Inventor: Kei Kinoshita, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 16/701,288

(22) Filed: Dec. 3, 2019

(65) Prior Publication Data
US 2020/0186691 A1  Jun. 11, 2020

(30) Foreign Application Priority Data
Dec. 6, 2018 (JP) .............................. JP2018-228898

(51) Int. Cl.
*H04N 5/232* (2006.01)
*G02B 7/04* (2021.01)
*H04N 5/225* (2006.01)

(52) U.S. Cl.
CPC .............. *H04N 5/232* (2013.01); *G02B 7/04* (2013.01); *H04N 5/2253* (2013.01); *H04N 5/2254* (2013.01)

(58) Field of Classification Search
CPC .... H04N 5/232; H04N 5/2253; H04N 5/2254; G02B 7/04
See application file for complete search history.

(56) References Cited

U.S. PATENT DOCUMENTS

| 2001/0055481 | A1* | 12/2001 | Yoshikawa | ............ H04N 5/232 396/89 |
| 2005/0063693 | A1* | 3/2005 | Yoshibe | .................. G02B 7/28 396/81 |
| 2017/0099428 | A1* | 4/2017 | Okuyama | .......... H04N 5/23245 |
| 2018/0143399 | A1* | 5/2018 | Okawa | ............... H04N 5/23212 |

FOREIGN PATENT DOCUMENTS

JP   2003287672 A   10/2003

* cited by examiner

*Primary Examiner* — Nhan T Tran
(74) *Attorney, Agent, or Firm* — Rossi, Kimms & McDowell LLP

(57) ABSTRACT

Provided is an operation apparatus configured to perform an operation of driving an optical member in a lens apparatus, the operation apparatus including: an operation member for the operation; a detector configured to detect an amount of operation of the operation member; a communication device configured to receive a first information from the lens apparatus, the first information being an information on a state of the optical member; and a processor configured to: select, as a preset information for the operation, one of the first information and a second information based on a setting, the second information being an information on the amount of operation; and generate a command for the operation based on the selected one of the first information and the second information.

12 Claims, 11 Drawing Sheets

OPERATION APPARATUS, OPTICAL APPARATUS, AND IMAGE PICKUP APPARATUS

BACKGROUND OF THE INVENTION

Field of the Invention

The present invention relates to an operation apparatus, an optical apparatus, and an image pickup apparatus.

Description of the Related Art

A lens apparatus included in an image pickup apparatus, for example, a television camera, drives an optical member by a control system (servo system) including a drive device, for example, a motor. An operation apparatus configured to generate a command corresponding to an amount (e.g., rotational angle) of operation of an operation member is used to give a command to the control system. The operation apparatus has a preset function of driving an optical member (e.g., a lens unit for zooming or focusing) to a preset position, or a tracking function of setting a restriction on a range of driving the optical member by using a preset position (Japanese Patent Application Laid-Open No. 2003-287672).

Position information that may be used in each function disclosed in Japanese Patent Application Laid-Open No. 2003-287672 is any one of information on an actual position of a lens unit and information on a command output by the operation apparatus. In any case, when there is a deviation between the command output by the operation apparatus and the position of the lens unit, the above-mentioned function may not be able to implement an operation of the optical member intended by the user. For example, a command from the operation apparatus indicates a position deviating from the actual position of the lens unit when an additive command from another controller connected to a camera is used to operate the lens apparatus. Further, even when a command indicating an edge of a movable range of the lens unit is given, the position indicated by the command and the actual position of the lens unit may deviate from each other due to a temporal change in posture of the lens apparatus or in drive torque of the lens unit, for example. In this case, the use of the actual position of the lens unit may result in a failure to position the edge intended by the user. As described above, it is not preferred to use any one of the information on the actual position of the lens unit and the information on the command output by the operation apparatus as the position information to be used in each function.

SUMMARY OF THE INVENTION

An aspect of embodiments provides, for example, an operation apparatus beneficial in accurate performing of an operation of driving an optical member.

In order to achieve the above-mentioned object, according to at least one embodiment of the present invention, there is provided an operation apparatus configured to perform an operation of driving an optical member in a lens apparatus, the operation apparatus including: an operation member for the operation; a detector configured to detect an amount of operation of the operation member; a communication device configured to receive a first information from the lens apparatus, the first information being an information on a state of the optical member; and a processor configured to: select, as a preset information for the operation, one of the first information and a second information based on a setting, the second information being an information on the amount of operation; and generate a command for the operation based on the selected one of the first information and the second information.

Further features of the present invention will become apparent from the following description of exemplary embodiments with reference to the attached drawings.

DESCRIPTION OF THE EMBODIMENTS

Now, exemplary embodiments of the present invention are described in detail with reference to the accompanying drawings.

Embodiment 1

Figure 1:
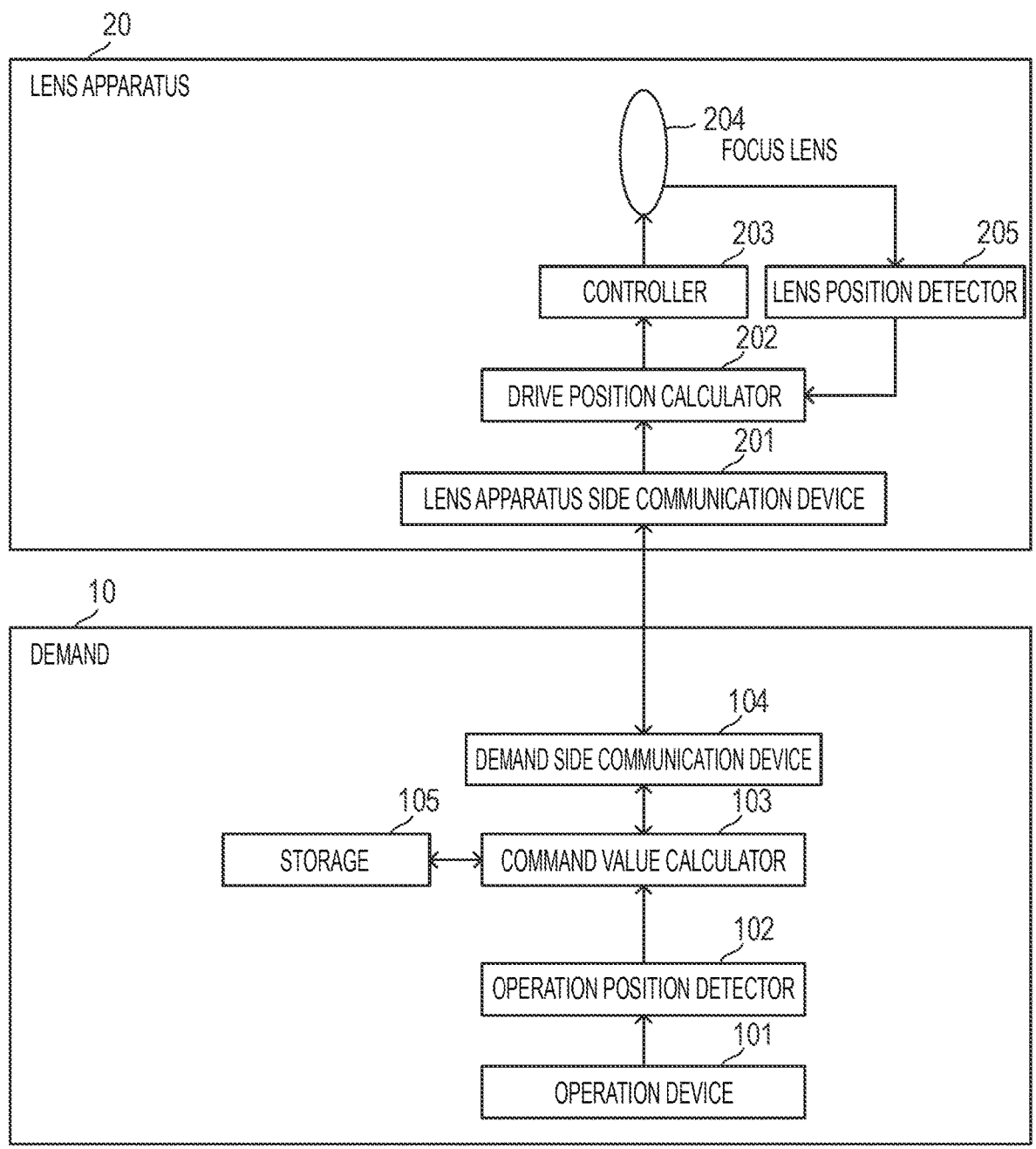
FIG. 1 is a block diagram of a lens apparatus and an operation apparatus according to Embodiment 1 of the present invention.

FIG. 1 is a block diagram of a lens apparatus and an operation apparatus according to Embodiment 1 of the present invention.

A demand 10 is an operation apparatus for operating a lens apparatus 20. For the sake of simplicity of description, the demand 10 for driving focus and the lens apparatus 20 for driving a focus lens (optical member, which is a lens unit for focusing) are described. However, the focus lens may be replaced with another lens, for example, a zoom lens.

An operation device 101 is an operation member for a photographer to operate the focus lens, and for example, a knob enabling a rotation operation is used as the operation device 101. The operation device 101 may be a push/pull bar or an operation member that uses a rotation member.

An operation position detector 102 is a position sensor, for example, a potentiometer or a rotary encoder, and is configured to output a position signal corresponding to an operation position of the operating device 101.

A command value calculator (processor) 103 is configured to use the operation position detector 102 and a storage 105 described later to calculate an operation command value.

A demand side communication device 104 is configured to encode an operation command value calculated by the command value calculator 103 into a communication command format, and send the operation command value to a lens apparatus side communication device 201 of the lens apparatus 20. Further, the demand side communication device 104 may receive position information on a focus lens 204 from the lens apparatus side communication device 201 of the lens apparatus 20.

The storage 105 is, for example, a non-volatile memory. The lens is moved to any position through operation of the operation device 101. The storage 105 is configured to store an operation command value calculated by the command value calculator 103 or position information on the focus lens 204, which is obtained from the lens apparatus side communication device 201 of the lens apparatus 20, with a switch (not shown) or the like serving as a trigger.

The lens apparatus side communication device 201 is included in the lens apparatus 20, and is configured to send and receive a command to and from the demand side communication device 104 of the demand 10. When receiving a command of the operation command value, the lens apparatus side communication device 201 decodes the received data, and sends the decoded data to a drive position calculator 202.

The drive position calculator 202 is configured to generate a drive signal for controlling drive of the focus lens 204 based on the operation command value, and send the drive signal to the controller 203.

The controller 203 is configured to control driving of the focus lens 204 based on the driving signal input from the drive position calculator 202.

The focus lens 204 is an optical element that is movable to adjust a focal point. The lens is not limited to a focus lens or a zoom lens, for example.

A lens position detector 205 is a position sensor configured to detect a position of the focus lens 204, and a detected position signal is input to the drive position calculator 202. The drive position calculator 202 and the lens position detector 205 perform feedback control on the focus lens 204.

In Embodiment 1, the operation member serves as a device configured to detect a lens position to detect the lens position via the demand side communication device 104. However, the operation member may detect a position of, for example, an operation ring of the lens by an encoder, for example. Further, in Embodiment 1 a description is given by distinguishing between the lens and the operation member. However, the configuration is not limited thereto, and the lens and the operation member may be integrated.

A lens system is constructed by the lens apparatus 20 and the demand 10 being an operation apparatus configured to operate a movable optical member (focus lens 204) included in the lens apparatus 20. Further, the image pickup apparatus is constructed by the lens system and an image pickup element (not shown) (camera apparatus including the image pickup element) arranged on an image plane of the lens apparatus 20.

Figure 2:
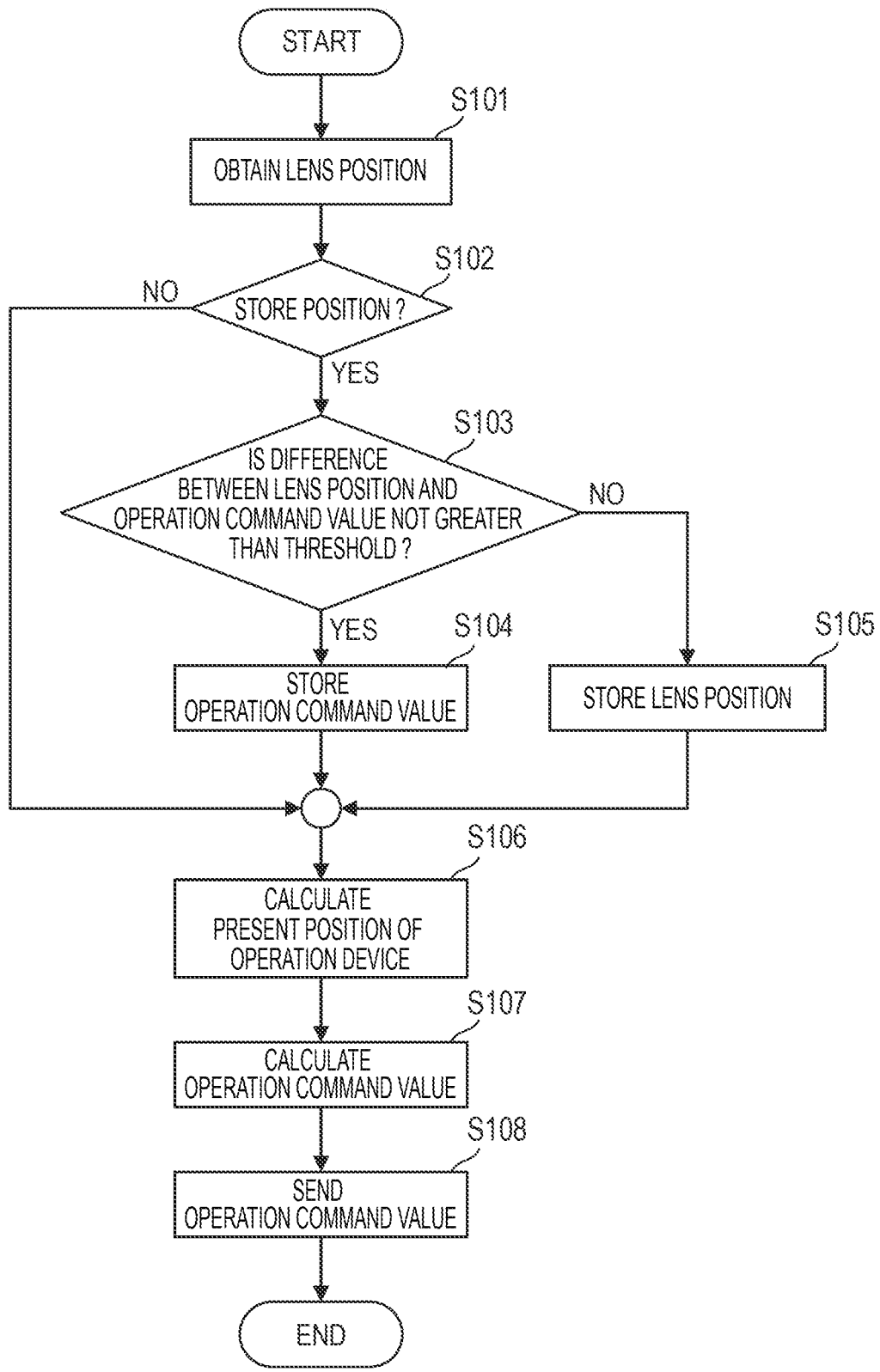
FIG. 2 is a flow chart of processing to be executed by a command value calculator in Embodiment 1.

FIG. 2 is a flow chart for illustrating operation command value calculation processing to be executed by the command value calculator 103.

In Step S101, the command value calculator 103 acquires, through communication, position information (second information being information on a state of the optical member corresponding to the amount of operation of the operation device 101 of the demand) on the lens apparatus 20 obtained by the demand side communication device 104, and the processing proceeds to Step S102.

In Step S102, the command value calculator 103 determines whether to store the position with an operation of, for example, a switch (first command device) for performing a position storing operation as a trigger. When the storing operation is to be performed, the processing proceeds to Step S103, whereas when the storing operation is not to be performed, the processing proceeds to Step S106.

Figure 3A:
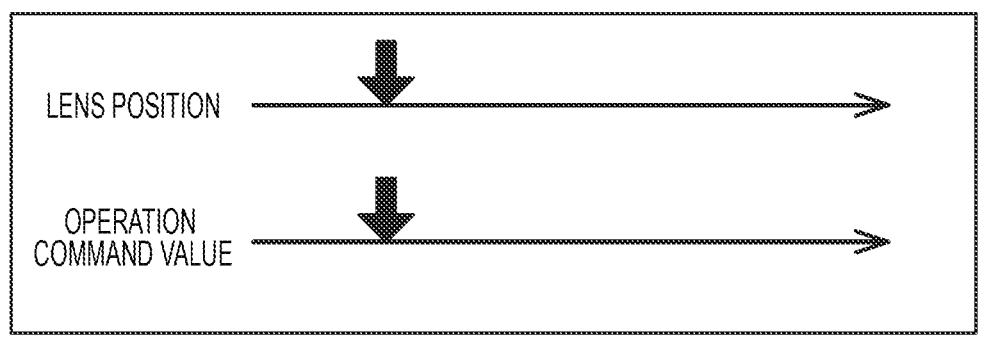
FIG. 3A is a diagram of an operation command value of a demand and a position of a lens in Embodiment 1.
Figure 3B:
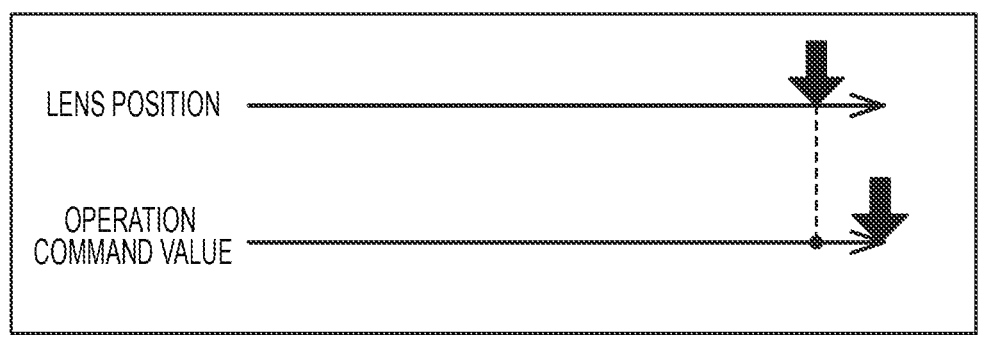
FIG. 3B is a diagram of the operation command value of the demand and the position of the lens in Embodiment 1.
Figure 3C:
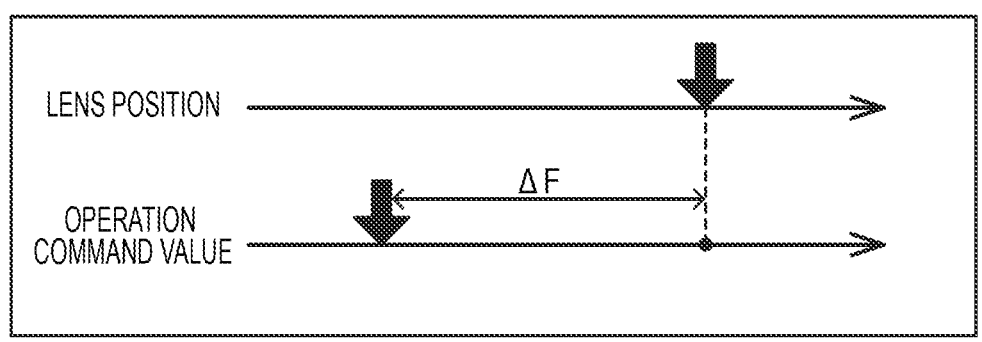
FIG. 3C is a diagram of the operation command value of the demand and the position of the lens in Embodiment 1.

In Step S103, the command value calculator 103 compares the lens position acquired in Step S101 with an operation command value (first information being information on the state of the optical member) to be sent from the demand 10 to the lens apparatus 20. In Embodiment 1, the operation command value is stored at the time of performing a normal position storing operation. The operation command values from the demand and the positions of the lens are illustrated in FIG. 3A to FIG. 3C. As illustrated in FIG. 3A, when the lens position follows the operation command value, the operation command value may be stored. The reason for using the operation command value is that the lens may not reach the lens position indicated by the operation command value because of control of preventing the lens from touching the edge of the lens when the operation command value indicates the edge as illustrated in FIG. 3B. When the lens position has been moved by another controller, for example, a camera, as illustrated in FIG. 3C, a deviation between the lens position and the operation command value may be generated. When the operation command value is stored at this timing, this means that an unintended position is stored in the case of viewing a video on a camera, display, or the like and using the lens position contained in the video.

In view of the above, a threshold is set for a value of a difference $\Delta F$ between the lens position and the operation command value, and when the value is not greater than the threshold, the processing proceeds to Step S104, and the operation command value is stored into the storage 105. When the value is greater than the threshold, the processing proceeds to Step S105, and the lens position is stored into the storage 105. That is, one of the operation command value and the lens position is selected and stored into the storage 105.

In Step S106, the command value calculator 103 reads a signal of the operation position detector 102, and obtains the present position of the operation device 101.

In Step S107, the command value calculator 103 calculates the operation command value to be sent to the lens apparatus 20 based on the information obtained in Step S106 and the position information (one of operation command value and lens position) stored in the storage 105. When the preset function of reproducing a stored operation with an operation of a switch (second command device), for example, as a trigger is executed, the operation command value stored in the storage 105 is adopted, and in Step S108, the calculated value is sent to the lens apparatus 20 via the demand side communication device 104.

The description has been given based on the preset function. However, the usage is not limited thereto, and for example, the operation command value can be restricted by using a function of restricting the range, for example.

As described above, it is possible to provide a lens operation apparatus capable of performing appropriate position control by appropriately switching Embodiment the position information to be stored into the storage 105.

Embodiment 2

Next, Embodiment 2 of the present invention is described with reference to FIG. 3B referred to in Embodiment 1 and FIG. 4. The configuration of Embodiment 2 is the same as that of FIG. 1 in Embodiment 1.

In Embodiment 1, in the operation of storing a position into the storage 105, when there is no deviation between the operation command value and the lens position, the operation command value is stored, whereas when there is a deviation, the lens position is stored. With this, such control as intended by a user who is using, for example, the preset function while viewing a video is achieved.

In Embodiment 2, the lens position is basically stored in the operation of storing the position into the storage 105. However, the lens position may not follow an operation command value when the operation command value is directed to the edge of the lens as illustrated in FIG. 3B. This phenomenon occurs when the lens does not reach the edge due to a mechanism for preventing the lens from touching a mechanical edge that restricts the movable range of the lens or due to movement of the lens because of the weight or difference in posture of the lens after the lens reaches the lens position indicated by the operation command value. When an operation command value directed to the edge of the lens is output, the user operates the operation device 101 so that the lens reaches the edge of the lens. As a result, there is a problem in that, when the position is stored, storage of the lens position that deviates from the edge of the lens may result in a failure to perform such control as intended by the user. Thus, when an operation command value directed to the edge of the lens is output, a value directed to the edge of the lens is stored.

Figure 4:
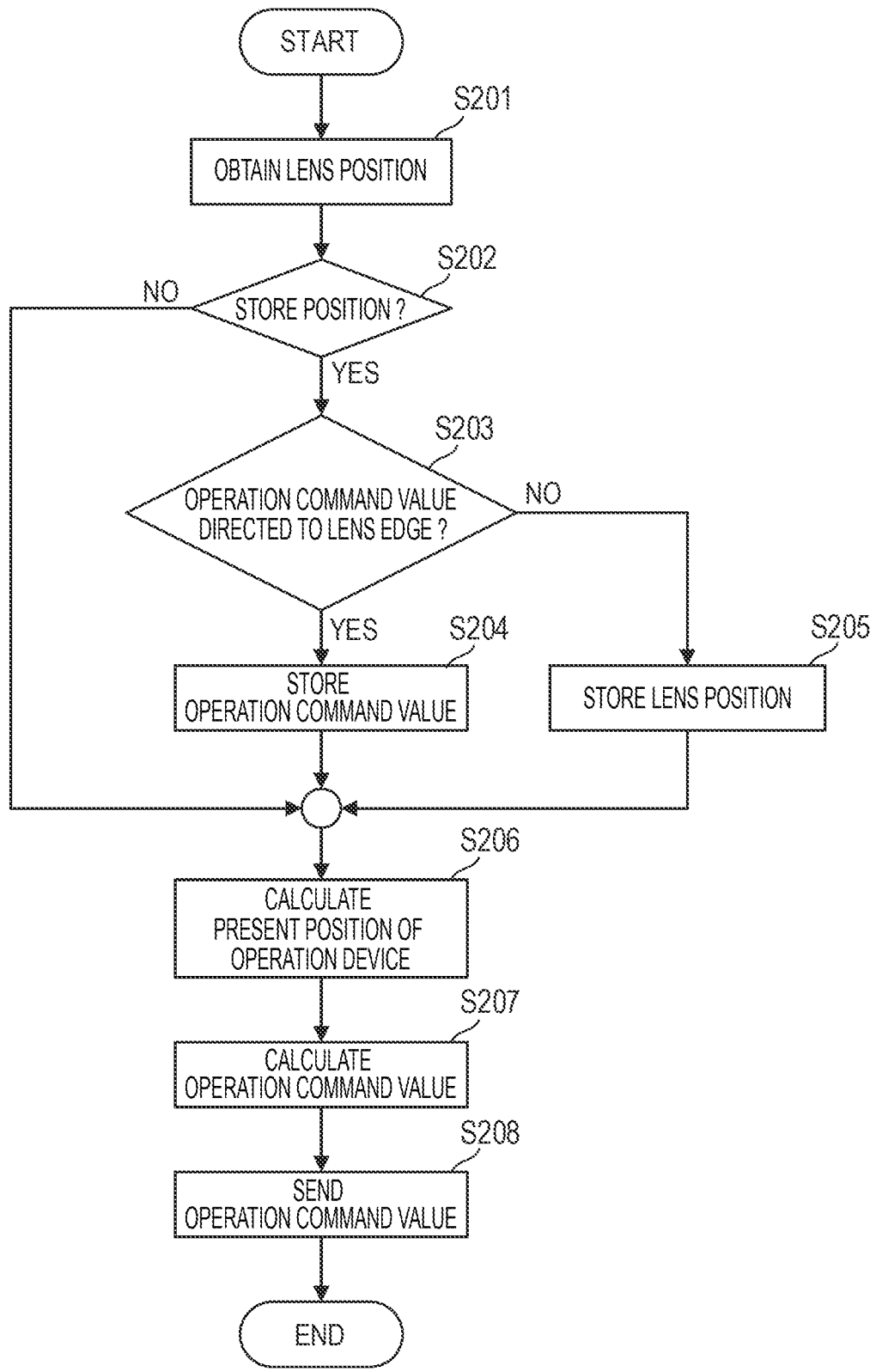
FIG. 4 is a flow chart of processing to be executed by the command value calculator in Embodiment 2 of the present invention.

FIG. 4 is a flow chart of operation command value calculation processing to be executed by the command value calculator 103.

In Step S201, the command value calculator 103 obtains, through communication, position information of the lens apparatus 20 obtained by the demand side communication device 104.

In Step S202, the command value calculator 103 determines whether to store the position with an operation of, for example, a switch for performing a position storing operation as a trigger. When the storing operation is to be performed, the processing proceeds to Step S203, whereas when the storing operation is not to be performed, the processing proceeds to Step S206.

In Step S203, when the operation command value to be sent from the demand 10 to the lens apparatus 20 is directed to the edge of the lens, the user intentionally performs an operation directed to the edge of the lens. Thus, the processing proceeds to Step S204, and the operation command value is stored into the storage 105. Otherwise, the processing proceeds to Step S205, and the lens position is stored into the storage 105.

In Step S206, the command value calculator 103 reads a signal of the operation position detector 102, and obtains the present position of the operation device 101.

In Step S207, the command value calculator 103 calculates an operation command value to be sent to the lens apparatus 20 based on the information of Step S206 and the position information stored in the storage 105. When the preset function is to be executed, the position information stored in the storage 105 is adopted, and in Step S208, the calculated value is sent to the lens apparatus 20 via the demand side communication device 104.

The description has been given based on the preset function. However, the usage is not limited thereto, and for example, the operation command value can be restricted by using a function of restricting the range, for example.

As described above, it is possible to provide a lens operation apparatus capable of performing appropriate position control by appropriately switching between the operation command value of the operation member and the lens position as the position information to be stored into the storage 105.

Embodiment 3

Next, Embodiment 3 of the present invention is described with reference to FIG. 3C, FIG. 5, and FIG. 6. The configuration of Embodiment 3 is the same as that of FIG. 1 in Embodiment 1.

In Embodiment 3, in a position storing operation, the operation command value and the lens position at that time are stored into the storage 105. Which one of those values stored in the position storing operation is to be adopted at the time of usage by presetting or the like is determined by setting a threshold for the difference $\Delta F$ between the operation command value and the lens position as illustrated in FIG. 3C, and an operation command value to be sent to the lens apparatus 20 is determined based on the information. With this, an effect similar to that of Embodiment 1 is obtained.

Figure 5:
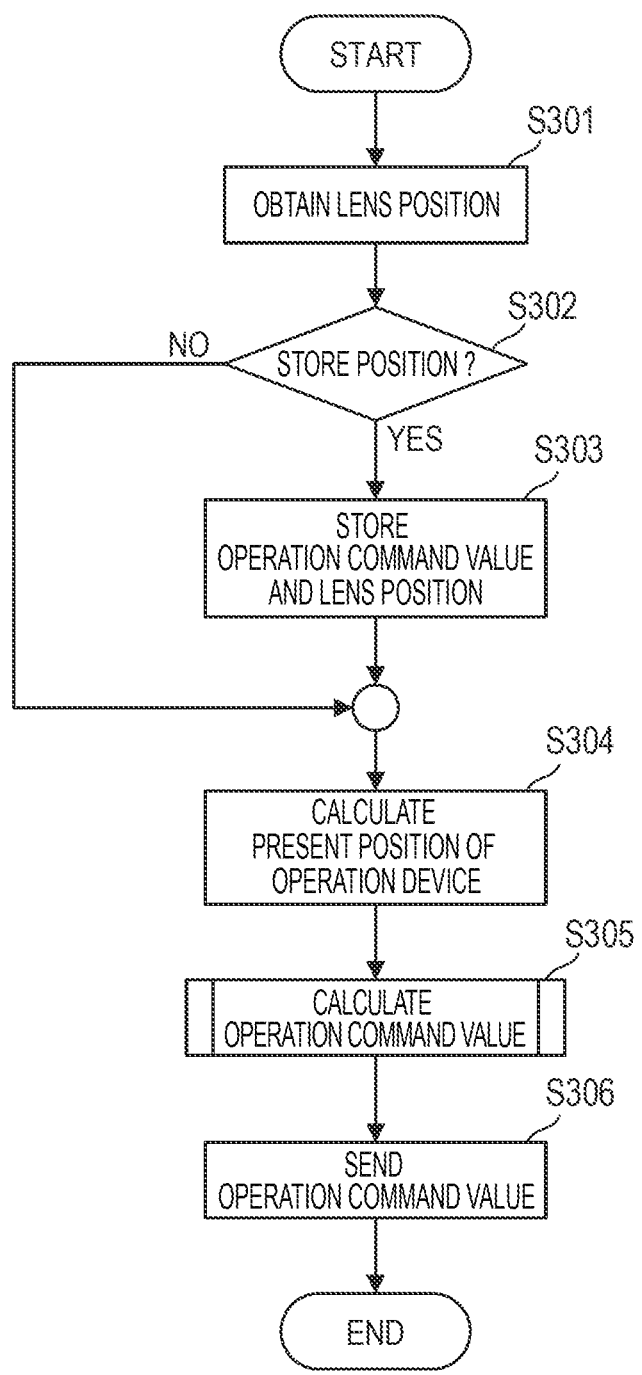
FIG. 5 is a flow chart of processing to be executed by the command value calculator in Embodiment 3 of the present invention.

FIG. 5 is a flow chart of operation command value calculation processing to be executed by the command value calculator 103.

In Step S301, the command value calculator 103 obtains a signal of the operation position detector 102, and obtains the present position of the operation device 101.

In Step S302, the command value calculator 103 determines whether to store the position with an operation of, for example, a switch for performing a position storing operation as a trigger. When the storing operation is to be performed, the processing proceeds to Step S303, whereas when the storing operation is not to be performed, the processing proceeds to Step S304.

In Step S303, the command value calculator 103 stores, into the storage 105, the lens position obtained in Step S301 and the lens position and operation command value to be sent from the demand 10 to the lens apparatus 20.

In Step S304, the command value calculator 103 reads a signal of the operation position detector 102, and obtains the present position of the operation device 101.

In Step S305, the command value calculator 103 calculates an operation command value to be sent to the lens apparatus 20 based on the information of Step S304 and the position information stored in the storage 105. When the preset function is to be executed, the position information stored in the storage 105 is adopted, and in Step S306, the calculated value is sent to the lens apparatus 20 via the demand side communication device 104.

Figure 6:
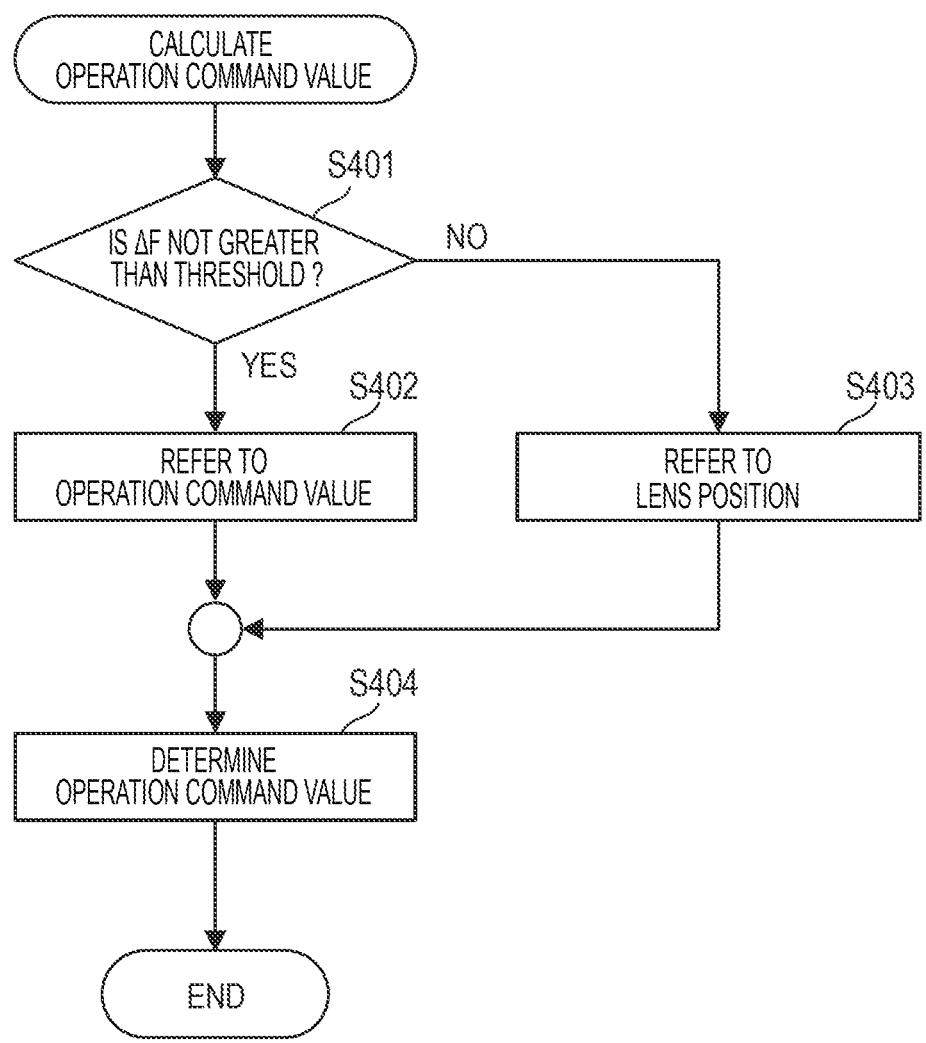
FIG. 6 is a detailed flow chart of processing to be executed by the command value calculator in Embodiment 3.

FIG. 6 is an illustration of a flow of processing in Step S305 in Embodiment 3. Now, a description is given based on the preset function for the simplicity of description. However, the function is not limited thereto as long as the function stores a position and reflects the value. The command value calculator 103 compares the difference ΔF between the operation command value and lens position stored in Step S303 with the threshold. When the difference ΔF is not greater than the threshold, the processing proceeds to Step S402 to refer to the stored operation command value, whereas when the difference is greater than the threshold, the command value calculator 103 refers to the lens position in Step S403. In Step S404, the command value calculator 103 sends the value referred to in Step S402 or Step S403 to the lens apparatus 20 via the demand side communication device 104 as an operation command value at the time of execution of the preset function.

As usage other than the preset function, when the present invention is applied to a function of restricting the range of driving the lens for simulation, positions of both ends of the drivable range are stored, and the stored position value is used as the operation command value for an outside of the drivable range. Further, various modifications can be made by relatively moving a position from the stored position through an operation of the operation device 101, for example.

As described above, it is possible to provide a lens operation apparatus capable of performing appropriate position control by appropriately switching between the operation command value and the lens position as the value to be referred to in the operation command value calculation processing of the command value calculator 103.

Embodiment 4

Next, Embodiment 4 of the present invention is described with reference to FIG. 3B, FIG. 5, and FIG. 7. The configuration of Embodiment 4 is the same as that of FIG. 1 in Embodiment 1.

In Embodiment 4, in a position storing operation, both the operation command value and the lens position at that time are stored into the storage 105. The lens position is basically referred to when those values stored in the position storing operation are used. However, the lens position may not follow an operation command value when the operation command value is directed to the edge of the lens as illustrated in FIG. 3B. Thus, when an operation command value directed to the edge of the lens is output, an operation command value directed to the edge of the lens, which is to be sent to the lens apparatus 20, is determined. With this, an effect similar to that of Embodiment 2 is obtained.

A flow for illustrating the operation command value calculation processing of the command value calculator 103 is similar to that of FIG. 5 described in Embodiment 3.

Figure 7:
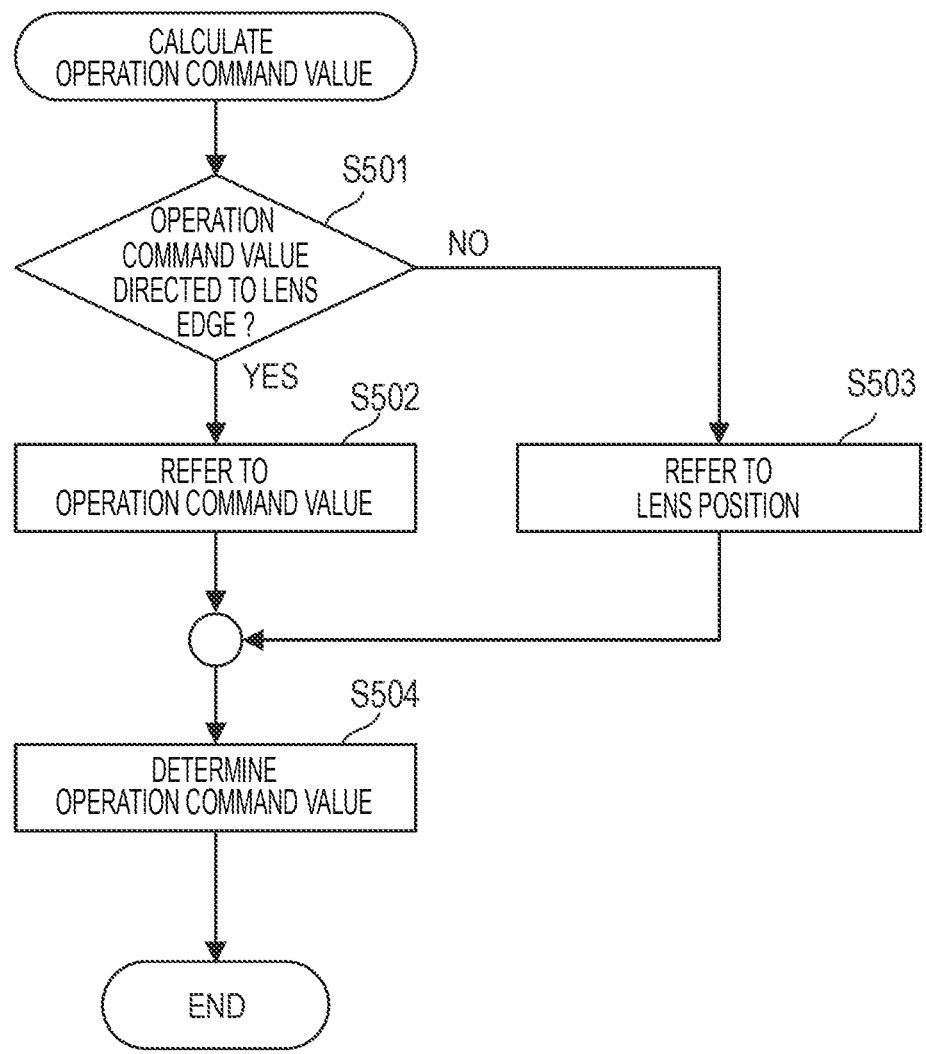
FIG. 7 is a detailed flow chart of processing to be executed by the command value calculator in Embodiment 4 of the present invention.

FIG. 7 is an illustration of a flow of processing of Step S305 in Embodiment 4.

Now, a case of executing the preset function is described for the simplicity of description. However, the function is not limited thereto as long as the function stores a position and reflects the value.

The command value calculator 103 determines whether the value is directed to the edge of the lens based on the operation command value and lens position stored in Step S303. When the operation command value is directed to the edge of the lens, the processing proceeds to Step S502 to refer to the stored operation command value, whereas when the operation command value is not directed to the edge of the lens, the command value calculator 103 refers to the lens position in Step S503. In Step S504, the command value calculator 103 sends the value referred to in Step S502 or Step S503 to the lens apparatus 20 via the demand side communication device 104 as an operation command value at the time of execution of the preset function.

As usage other than the preset function, when the present invention is applied to a function of restricting the range of driving the lens for simulation, positions of both ends of the drivable range are stored, and the stored position value is used as the operation command value for an outside of the drivable range. Further, various modifications can be made by relatively moving the position from the stored position through an operation of the operation device 101, for example.

As described above, it is possible to provide a lens operation apparatus capable of performing appropriate position control by appropriately switching between the operation command value and the lens position as the value to be referred to in the operation command value calculation processing of the command value calculator 103.

Embodiment 5

Next, Embodiment 5 of the present invention is described with reference to FIG. 5, FIG. 8A to FIG. 8E, and FIG. 9. The configuration of Embodiment 5 is the same as that of FIG. 1 in Embodiment 1.

The lens apparatus 20 receives an operation command value from the demand 10, and drives the lens to a predetermined position. Meanwhile, another controller, for example, a camera, has a follow focus function of giving such a command as to be superimposed on the operation command value.

Figure 8A:
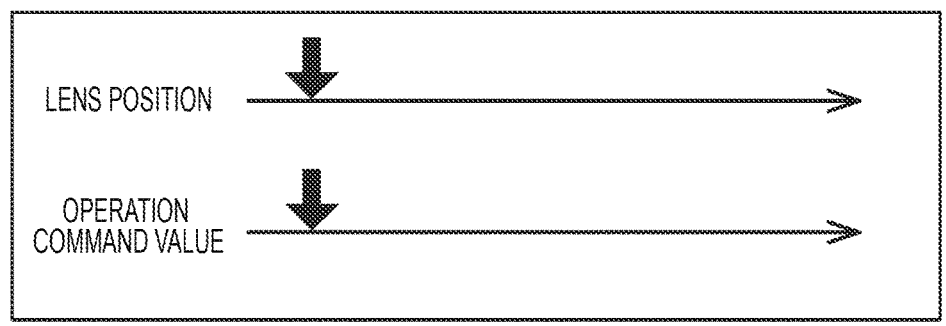
FIG. 8A is a diagram of the operation command value of the demand and the position of the lens in Embodiment 5 of the present invention.
Figure 8B:
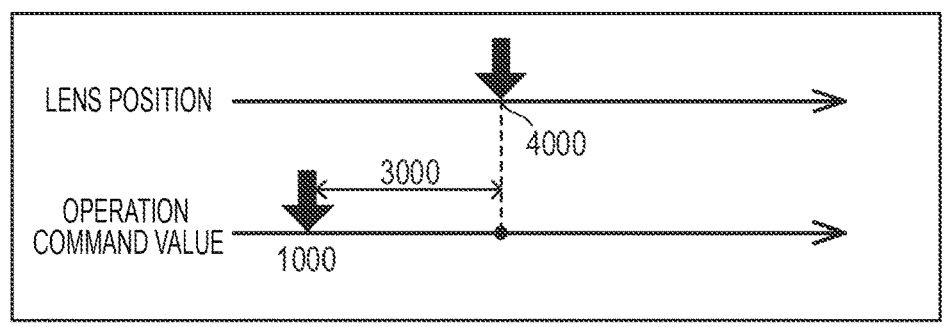
FIG. 8B is a diagram of the operation command value of the demand and the position of the lens in Embodiment 5.
Figure 8C:
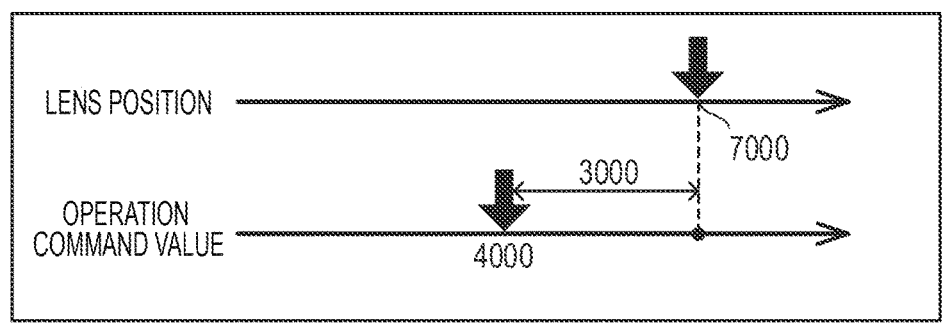
FIG. 8C is a diagram of the operation command value of the demand and the position of the lens in Embodiment 5.
Figure 8D:
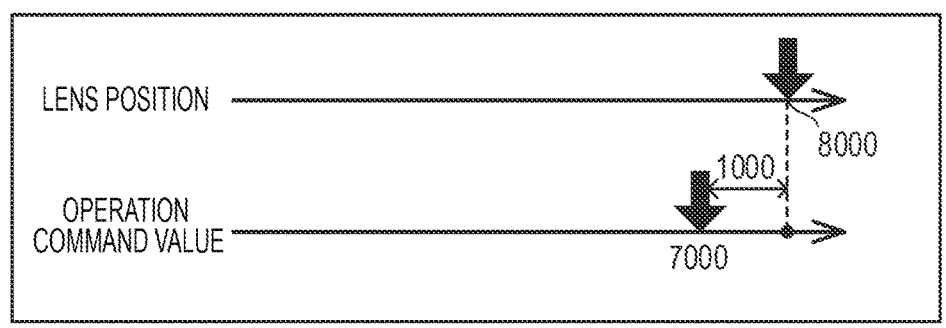
FIG. 8D is a diagram of the operation command value of the demand and the position of the lens in Embodiment 5.
Figure 8E:
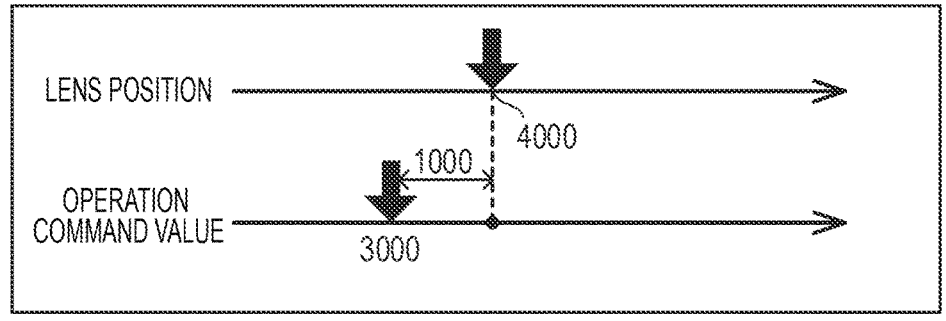
FIG. 8E is a diagram of the operation command value of the demand and the position of the lens in Embodiment 5.

FIG. 8A to FIG. 8E are illustrations of motions of the preset function to be executed in combination with the motion of the lens during execution of the follow focus function. FIG. 8A is an illustration of a situation in which the lens apparatus 20 moves in accordance with the operation command value given by the demand 10. FIG. 8B is an illustration of a state in which another controller, for example, a camera, operates the lens apparatus 20 by giving such a command as to be superimposed on the present operation command value under the state of FIG. 8A. For example, when the operation command value given by the demand 10 indicates 1,000, and 3,000 is input to the lens apparatus 20 from another controller, for example, a camera, by the follow focus function, the lens position moves to a position indicated by 4,000. That is, even when the operation command value output by the demand 10 has changed, the lens position deviates through superimposition on that value. Under this state, for example, when the focus present function or the like is executed, as illustrated in FIG. 8C, the lens position (4,000) is stored. Then, when the value is sent to the lens apparatus 20 as the operation command value (4,000), the lens position moves to the position indicated by 7,000 by the follow focus function. In this manner, there is a problem in that the stored value cannot be reflected in the intended position. Further, the value to be superimposed by the follow focus function as illustrated in FIG. 8D changes due to another controller. Thus, as illustrated in FIG. 8E, the operation command value is required to be output to move the lens to the target lens position in consideration of a difference between the operation command value and the lens position of FIG. 8B, that is, at the time of storage by presetting or the like, and a difference between the operation command value and the lens position of FIG. 8D, that is, at the time of execution of presetting or the like (at the time of selecting one of operation command value and lens position). With this, it is possible to perform such a lens operation as intended by the user also for control of superimposition by another controller.

The flow for illustrating the operation command value calculation processing of the command value calculator 103 is similar to that of FIG. 5 described in Embodiment 3.

Figure 9:
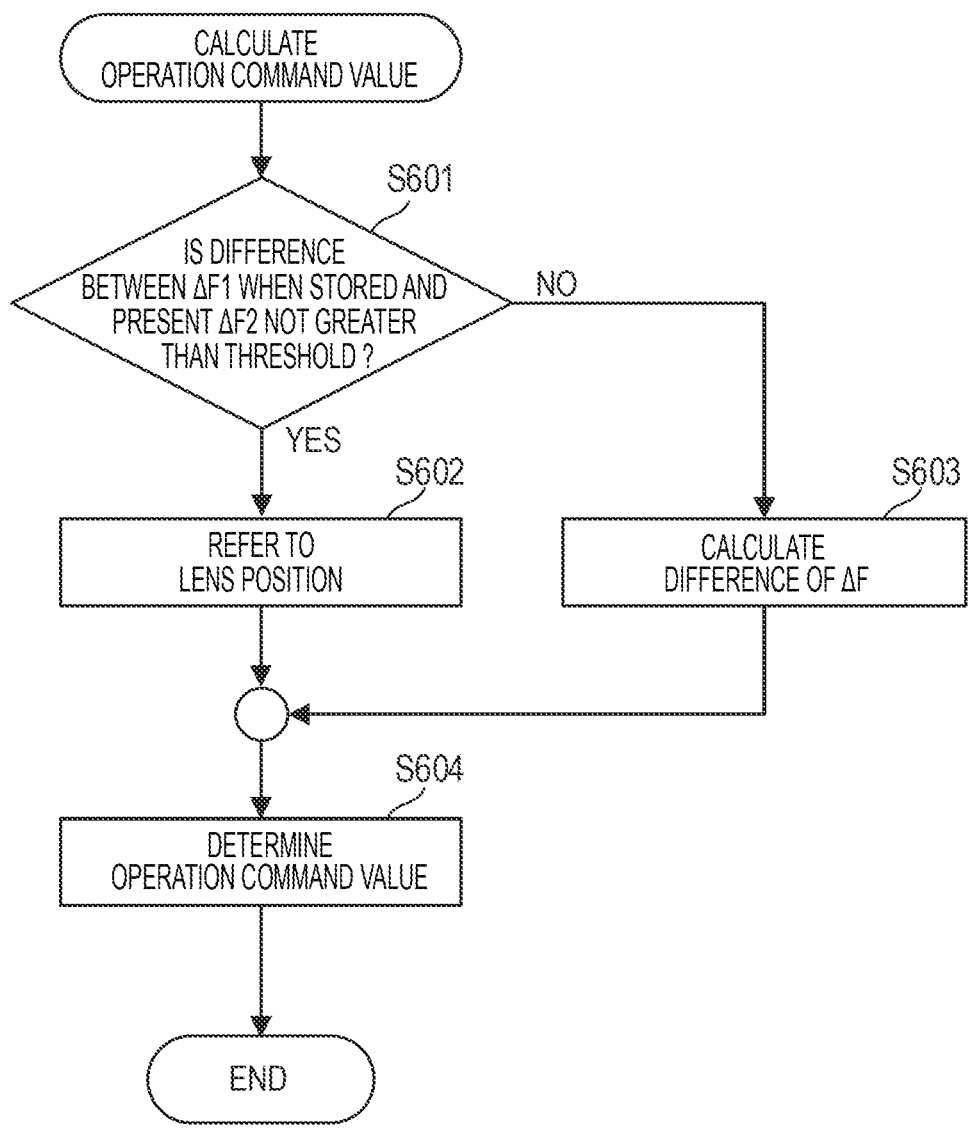
FIG. 9 is a detailed flow chart of processing to be executed by the command value calculator in Embodiment 5.

FIG. 9 is an illustration of a flow of processing of Step S305 in Embodiment 5.

Now, a case of executing the preset function is described for the simplicity of description. However, the function is not limited thereto as long as the function stores a position and reflects the value.

In Step S601, a command to execute presetting is issued, and the command value calculator 103 compares a difference ΔF1 between the operation command value and lens position stored in Step S303 of FIG. 5 with a difference ΔF2 between the operation command value currently output by the demand 10 and the lens position. A threshold is set for a difference between ΔF1 and ΔF2, and when the difference is not greater than the threshold, the command value calculator 103 refers to the lens position to determine the operation command value in Step S604. When the difference is greater than the threshold, the command value calculator 103 refers to the difference between ΔF1 and ΔF2. The difference is obtained, and as illustrated in FIG. 8A to FIG. 8E, the operation command value is determined in Step S604 in consideration of superimposition on the present operation command value in order to move the lens to the lens position at the time of the position storing operation. At this time, the lens position at the time of a position storing operation is referred to when the difference is not greater than the threshold. However, the operation command value at the time of a position storing operation may be referred to in the case of Embodiment 5.

As described above, it is possible to provide a lens operation apparatus capable of performing appropriate position control by appropriately considering the difference between the operation command value and the lens position.

Embodiment 6

Figure 10:
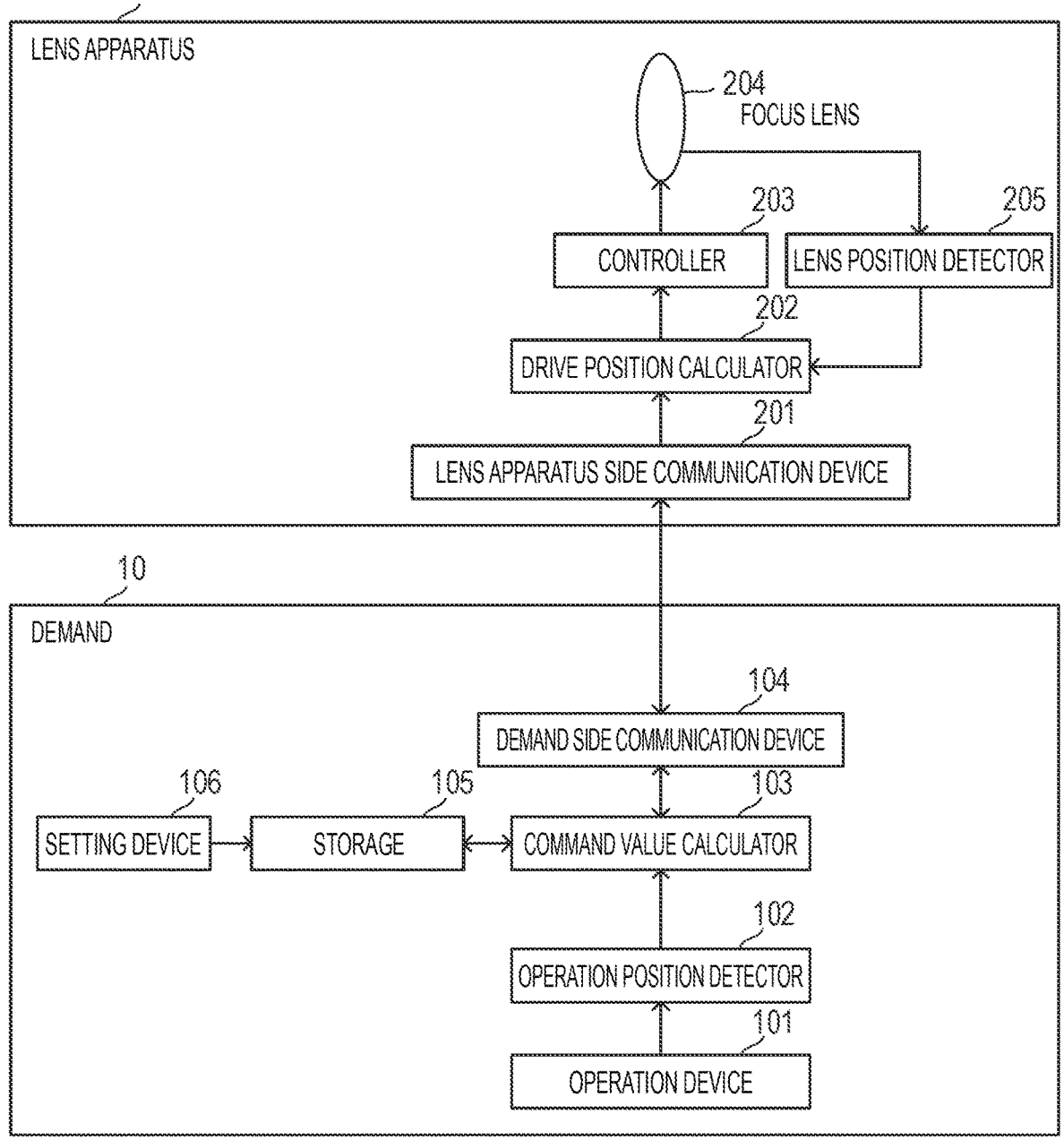
FIG. 10 is a block diagram of a lens apparatus and an operation apparatus according to Embodiment 6 of the present invention.

FIG. 10 is a block diagram of a lens apparatus and an operation apparatus according to Embodiment 6 of the present invention.

The demand 10 is an operation apparatus for operating the lens apparatus 20. For the sake of simplicity of description, the demand 10 for driving focus and the lens apparatus 20 for driving a focus lens are described. However, the focus lens may be replaced with another lens, for example, a zoom lens.

The operation device 101 is an operation member for a photographer to operate the focus lens (movable optical member), and for example, a knob enabling a rotation operation is used as the operation device 101. The operation device 101 may be a push/pull bar or an operation member that uses a rotation member.

The operation position detector 102 is a position sensor, for example, a potentiometer or a rotary encoder, and is configured to output a position signal corresponding to an operation position of the operating device 101.

The command value calculator 103 is configured to use the operation position detector 102 and the storage 105 described later to calculate an operation command value.

The demand side communication device 104 is configured to encode an operation command value calculated by the command value calculator 103 into a communication command format, and send the operation command value to the lens apparatus side communication device 201 of the lens apparatus 20. Further, the demand side communication device 104 is configured to receive the lens position of the focus lens 204 from the lens apparatus side communication device 201 of the lens apparatus 20.

The storage 105 is, for example, a non-volatile memory. The lens is moved to any position through operation of the operation device 101. The storage 105 is configured to store an operation command value calculated by the command value calculator 103 or position information on the focus lens 204, which is obtained from the lens apparatus side communication device 201 of the lens apparatus 20, with a switch (not shown) or the like serving as a trigger.

The setting device 106 is configured to determine which one of the position information of the demand 10 and the position information of the lens apparatus 20 is to be adopted in, for example, the preset function of storing the position and determining the operation command value or the function of restricting the position. The setting device 106 is constructed by, for example, a display or a switch, but the setting device 106 may hold a setting input through an external PC, for example.

The lens apparatus side communication device 201 is constructed inside the lens apparatus 20, and is configured to send/receive a command to/from the demand side communication device 104 of the demand 10. When the lens apparatus side communication device 201 has received a command of the operation command value, the lens apparatus side communication device 201 decodes the received data and sends the decoded data to the drive position calculator 202.

The drive position calculator 202 is configured to generate a drive signal for controlling drive of the focus lens 204 based on the operation command value, and send the drive signal to the controller 203.

The controller 203 is configured to control drive of the focus lens 204 based on the drive signal input by the drive position calculator 202.

The focus lens 204 is an optical element capable of adjusting a focal point by moving in the optical-axis direction. However, the lens is not limited to a focus lens, a zoom lens, or the like.

The lens position detector 205 is a position sensor configured to detect the position of the focus lens 204, and the detected position information is input to the drive position calculator 202. The drive position calculator 202 and the lens position detector 205 execute feedback control of the focus lens 204.

Figure 11:
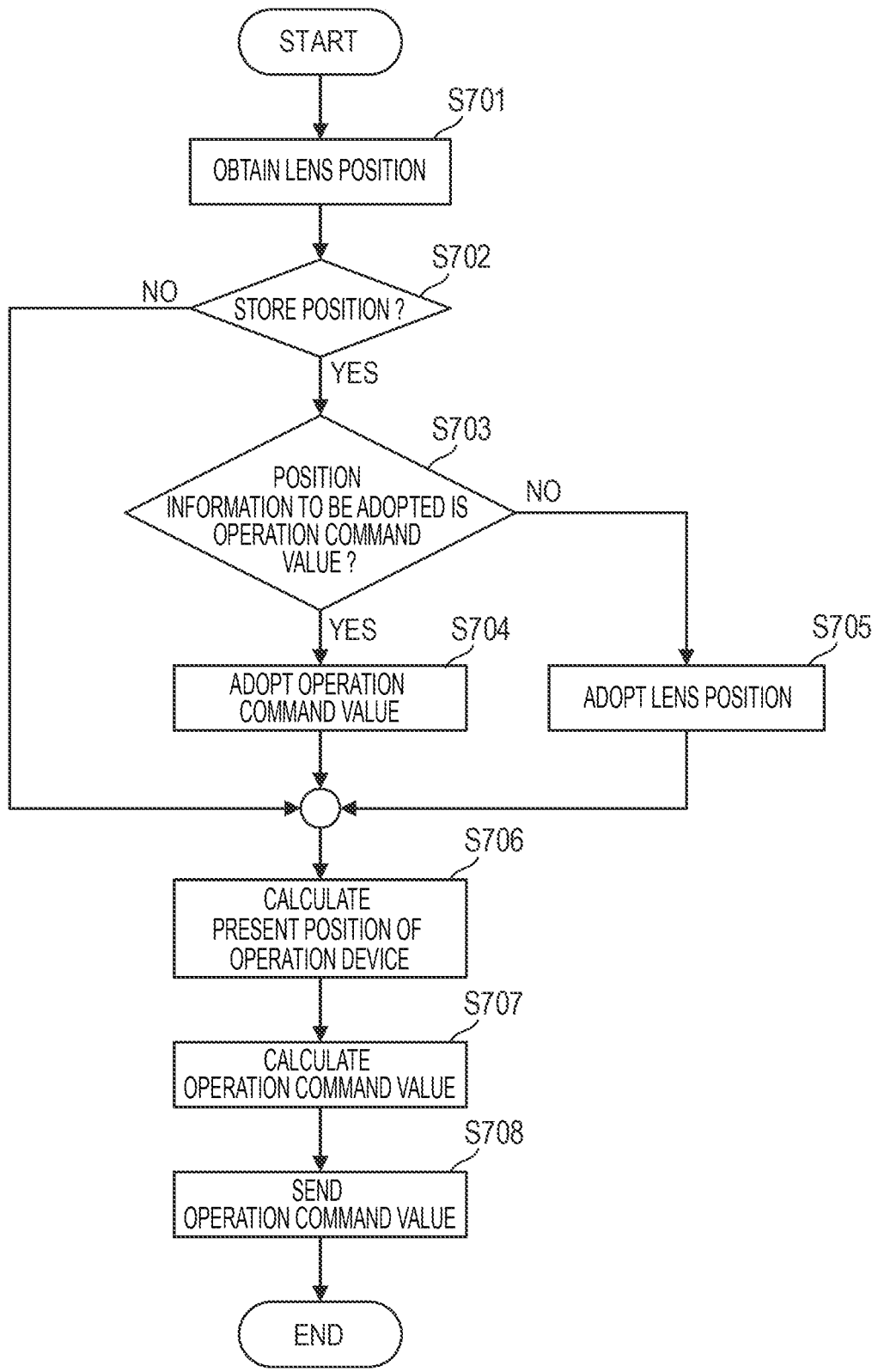
FIG. 11 is a flow chart of processing to be executed by a command value calculator in Embodiment 6.

FIG. 11 is a flow chart for illustrating the operation command value calculation processing of the command value calculator 103.

In Step S701, the command value calculator 103 obtains, through communication, position information of the lens apparatus 20 obtained by the demand side communication device 104.

In Step S702, the command value calculator 103 determines whether to store the position with an operation of, for example, a switch for performing a position storing operation as a trigger. When the storing operation is to be performed, the processing proceeds to Step S703, whereas when the storing operation is not to be performed, the processing proceeds to Step S706.

In Step S703, the command value calculator 103 reads position information to be adopted, which is determined in advance by the setting device 106. The command value calculator 103 determines which one of the lens position of the lens apparatus 20 and the operation command value given by the demand 10 is to be stored, and when the position information to be adopted is the operation command value given by the demand 10, the processing proceeds to Step S704, whereas when the position information to be adopted is the lens position of the lens apparatus 20, the processing proceeds to Step S705. In Step S704 and Step S705, one of the lens position of the lens apparatus 20 and the operation command given by the demand 10 that has been adopted is stored into the storage 105.

In Step S706, the command value calculator 103 reads a value detected by the operation position detector 102, and in Step S707, calculates an operation command value in consideration of the value stored into the storage 105.

When the preset function is to be executed, the value stored in the storage 105 is adopted, and in Step S708, the calculated value is sent to the lens apparatus 20 via the demand side communication device 104.

The description has been given based on the preset function. However, the usage is not limited thereto, and for example, the operation command value can be restricted by using a function of restring the range, for example.

Further, in Embodiment 6, the setting device 106 determines the position information to be stored into the storage 105. However, both of the lens position and the operation command value may be stored into the storage 105, and which one of the lens position and the operation command value is to be adopted may be switched at the time of calculating a definitive operation command value.

As described above, it is possible to provide a lens operation apparatus capable of performing appropriate position control by appropriately switching between the operation command value of the operation member and the lens position as the position information to be adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-228898, filed Dec. 6, 2018, which is hereby incorporated by reference herein in its entirety.

What is claimed is:

1. An operation apparatus configured to operate an optical member in a lens apparatus, the operation apparatus comprising:
   an operation member;
   a detector configured to detect an operation of the operation member;
   a processor configured to generate a first command indicating a position of the optical member based on the detected operation; and
   a communication device configured to send the first command to the lens apparatus, and receive a position information of the optical member from the lens apparatus,
   wherein the processor is configured to:
   select one of the first command and the position information to preset a position corresponding to the selected one of the first command and the position information; and
   generate a second command for operating the optical member based on the preset position, wherein the optical member is operated based on the second command to the preset position, or the optical member is operated based on the second command with the preset position being an end of a movable range of the optical member.

2. The operation apparatus according to claim 1, wherein the processor is configured to select the position information in a case where a difference between a position corresponding to the first command and a position corresponding to the position information is greater than a threshold.

3. The operation apparatus according to claim 1, wherein the processor is configured to select the first command in a case where the first command is a command for operating the optical member to an end of a movable range of the optical member.

4. The operation apparatus according to claim 1, further comprising a storage configured to store the first command and the position information,
   wherein the processor is configured to select the stored position information in a case where a difference between a position corresponding to the stored command and a position corresponding to the stored position information is greater than a threshold.

5. The operation apparatus according to claim 1, further comprising a storage configured to store the first command and the position information,
   wherein the processor is configured to select the stored first command in a case where the stored first command is a command for operating the optical member to an end of a movable range of the optical member.

6. The operation apparatus according to claim 4,
   wherein the processor is configured to generate the second command further based on a temporal change in a difference between a position corresponding to the first command and a position corresponding to the position information.

7. The operation apparatus according to claim 1, further comprising a setting device configured to set one of the first command and the position information which the processor is to select.

8. The operation apparatus according to claim 1, wherein the processor is configured to perform a preset function for reproducing the preset position.

9. The operation apparatus according to claim 1, wherein the processor is configured to perform a restricting function of restricting a movable range of the optical member by the preset position.

10. The operation apparatus according to claim 1, wherein the optical member includes a lens unit for focusing.

11. An optical apparatus comprising:
    a lens apparatus including an optical member, and
    an operation apparatus configured to operate the optical member in the lens apparatus,
    wherein the operation apparatus comprises:
    an operation member;
    a detector configured to detect an operation of the operation member;
    a processor configured to generate a first command indicating a position of the optical member based on the detected operation; and
    a communication device configured to send the first command to the lens apparatus, and receive a position information of the optical member from the lens apparatus,
    wherein the processor is configured to:
    select one of the first command and the position information to preset a position corresponding to the selected one of the first command and the position information; and generate a second command for operating the optical member based on the preset position, wherein the optical member is operated based on the second command to the preset position, or the optical member is operated based on the second command with the preset position being an end of a movable range of the optical member.

12. An image pickup apparatus comprising:
an optical apparatus; and
an image pickup element configured to receive an image formed by the optical apparatus,
wherein the optical apparatus comprises:
a lens apparatus including an optical member, and
an operation apparatus configured to operate the optical member in the lens apparatus,
wherein the operation apparatus comprises:
an operation member;
a detector configured to detect an operation of the operation member;
a processor configured to generate a first command indicating a position of the optical member based on the detected operation; and
a communication device configured to send the first command to the lens apparatus, and receive a position information of the optical member from the lens apparatus; and
wherein the processor is configured to:
select one of the first command and the position information to preset a position corresponding to the selected one of the first command and the position information; and
generate a second command for operating the optical member based on the preset position, wherein the optical member is operated based on the second command to the preset position, or the optical member is operated based on the second command with the preset position being an end of a movable range of the optical member.

* * * * *